United States Patent
Noerpel et al.

(10) Patent No.: US 10,355,778 B1
(45) Date of Patent: Jul. 16, 2019

(54) STATIONARY FIXED GROUND-BASED CELLS IN A NON-GEOSTATIONARY ORBIT COMMUNICATIONS SYSTEM

(71) Applicant: Hughes Network Systems, LLC, Germantown, MD (US)

(72) Inventors: Anthony Noerpel, Lovettsville, VA (US); Udaya Bhaskar, North Potomac, MD (US); Stanley Kay, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/859,580

(22) Filed: Dec. 31, 2017

(51) Int. Cl.
  *H04B 7/204* (2006.01)
  *H04B 7/185* (2006.01)

(52) U.S. Cl.
  CPC ....... *H04B 7/2041* (2013.01); *H04B 7/18519* (2013.01); *H04B 7/18521* (2013.01); *H04B 7/18526* (2013.01); *H04B 7/18563* (2013.01); *H04B 7/18513* (2013.01); *H04B 7/18515* (2013.01)

(58) Field of Classification Search
  CPC .............. H04B 7/2041; H04B 7/18532; H04B 7/18504; H04B 7/1851; H04B 7/18578
  USPC .......... 455/12.1, 427, 13.2, 13.3, 3.02, 3.01, 455/422.1, 403, 445, 428, 429, 550.1; 370/310, 316, 323; 342/354, 359, 372
  See application file for complete search history.

(56) References Cited

U.S. PATENT DOCUMENTS

| | | | | |
|---|---|---|---|---|
| 5,736,959 A | * | 4/1998 | Patterson | H01Q 1/242 342/354 |
| 6,081,227 A | * | 6/2000 | Haber | H01Q 1/288 342/354 |

\* cited by examiner

*Primary Examiner* — Keith Ferguson
(74) *Attorney, Agent, or Firm* — Potomac Technology Law, LLC

(57) ABSTRACT

A telecommunications platform comprises an antenna configured to generate a plurality of communications beams within a respective footprint on the surface of the Earth, wherein each communications beam provides data communications services over a respective cell coverage area on the surface of the Earth. The telecommunications platform further comprises a processor configured to control the plurality of communications beams of the antenna to form the respective cell coverage areas in a fixed cell pattern that remains essentially fixed relative to the surface of the Earth, such that, as the telecommunications platform travels through an orbit around the Earth, the footprint of the antenna sweeps across the fixed cell pattern and provides the communications services via the cell coverage areas of the fixed cell pattern that are within the footprint of the antenna at any given point in time.

18 Claims, 13 Drawing Sheets

STATIONARY FIXED GROUND-BASED CELLS IN A NON-GEOSTATIONARY ORBIT COMMUNICATIONS SYSTEM

TECHNICAL FIELD

The present invention relates to generation of wireless communications beams (e.g., satellite or high altitude platform (HAP) beams) and illumination of the respective cells on the surface of the Earth for a data communications system, and more specifically to the generation of such communications beams for the illumination of respective uniform or fixed cells on the surface of the Earth.

BACKGROUND

Conventional multi-beam communications satellites (e.g., spot beam medium earth orbit (MEO) and low earth orbit (LEO) satellites) and high altitude platforms (HAPs) are generally designed in a manner whereby a given geographic coverage area is serviced by a pattern of beams defined based on the geometry of the antenna (e.g., employing conventional parabolic reflector antennas). In such conventional designs, the radiation patterns of the satellite/HAP antennae are fixed and consequently generate a configuration of beams that are fixed in terms of their scan angle, beam width and directivity as preconfigured on the satellite/HAP. These beams sweep across the ground as the satellite/HAP moves though its orbit or flight pattern. A user terminal at a fixed geographical location is thus served sequentially by the different beams as the fixed beams sweep across the geographic site or cell where the terminal is located. For example, in a satellite or HAP system, the period of a satellite orbit is determined by the altitude of the satellite orbit. For example, for a typical LEO satellite at an orbit of about 1200 km altitude, the orbital period is less than two hours. Further, since such a system typically employs beams with high directivity corresponding to small beam widths, the user terminal experiences a beam handover as often as every 10 to 20 seconds, where each handover may require a change in frequency and polarization on the part of the terminal, which has to be synchronized at the satellite.

Accordingly, the processing for each handover requires frequent, and as such inefficient, use of the computing and transmission resources of the satellite/HAP. Further, from the time that a handover from one beam to another becomes necessary and the time the handover is completed, the communications link with the current beam may be lost or degraded, and thus the data transmissions are interrupted until the link with the new beam is established. In such cases the data transmissions must be terminated prior to the point of the loss of transmission capability and until the transmissions can be resumed via the new beam, otherwise the respective data packets may be lost and have to be retransmitted. Then, once the transmissions are resumed, the system must "catch up" with the data transmissions and first transmit the delayed packets—however, this introduces latency in data transmission as well as latency jitter, which may be unacceptable for certain applications (e.g., real-time applications such as voice over IP).

For example, FIG. 1 illustrates a cell pattern on the ground as would be illuminated by a conventional multi beam reflector antenna with a feed array or a phased array antenna, generating a beam pattern fixed with respect to the satellite/HAP frame of reference. The cell pattern of FIG. 1 illustrates the projected beam pattern based on a LEO satellite, at a given altitude, which is fitted with an antenna structure (for example a reflector antenna or a phased array antenna) that forms fixed 3.22 degree diameter beams in any direction. As is apparent from the illustrated example, while all of the beams are identical from the perspective of the satellite (e.g., forming 3.22 degree beams in the azimuth and elevation sphere of the satellite), as projected onto the ground, the beams vary in size from 70 km in diameter to 560 km diameter (along the longest diameter of the oblong-shaped cells). Accordingly, the bit rate density as measured in bits per second per kilometer squared will vary considerably. Also, each beam is preconfigured to operate at a fixed frequency/polarization resource. Hence, as the beams move over a ground terminal, the terminal must be handed-over from beam-to-beam as the beam cells move across the surface of the Earth where the terminal is situated. This requires the terminal to continually adjust its frequency/polarization to match that of the satellite beam within which it is currently located.

What is needed, therefore, are approaches for wireless communications systems (e.g., satellite communications systems) that employ spot-beam (or cell) patterns that are fixed with respect to the earth frame of reference (i.e., fixed ground-based beams).

SOME EXAMPLE EMBODIMENTS

The present invention advantageously addresses the foregoing requirements and needs, as well as others, by providing approaches for wireless communications systems (e.g., satellite communications systems) that employ spot-beam (or cell) patterns that are fixed with respect to the earth frame of reference (i.e., fixed ground-based beams). The communications platform (e.g., satellite or HAP) of such a system generates dynamically varying beams with respect to the satellite frame of reference. The scan angle, beam-width and directivities of such beams are varied such that they illuminate a uniformly sized cell pattern across the surface of the Earth and maintains the same uniform cell sizing as the platform travels over respective coverage areas on the surface of the Earth.

In accordance with example embodiments, a wireless telecommunications platform comprises at least one antenna. The at least one antenna is configured to generate a plurality of communications beams within a respective footprint on the surface of the Earth, wherein each communications beam provides data communications services over a respective cell coverage area on the surface of the Earth. The wireless telecommunications platform further comprises a processor configured to control the plurality of communications beams of at least one of the at least one antenna to form the respective cell coverage areas in a fixed cell pattern that remains essentially fixed relative to the surface of the Earth, such that, as the wireless telecommunications platform travels through an orbit around the Earth, the footprint of each of the at least one of the at least one antenna sweeps across the fixed cell pattern and provides the communications services via the cell coverage areas of the fixed cell pattern that are within the footprint of that antenna at any given point in time.

In accordance with further example embodiments, a method comprises generating, via an antenna of a wireless telecommunications platform, a plurality of communications beams within a respective footprint on the surface of the Earth, wherein each communications beam provides data communications services over a respective cell coverage area on the surface of the Earth. The method further comprises controlling the plurality of communications beams to form the respective cell coverage areas in a fixed cell pattern that remains essentially fixed relative to the surface of the Earth, such that, as the wireless telecommunications platform travels through an orbit around the Earth, the footprint of the antenna sweeps across the fixed cell pattern and provides the communications services via the cell coverage areas of the fixed cell pattern that are within the footprint of the antenna at any given point in time.

In accordance with such example embodiments, the antenna of the communications platform (e.g., satellite or HAP) forms communications beams to illuminate a uniform/fixed pattern of cells on the ground as the platform moves through its orbit or flight pattern. According to one such embodiment, the communications platform is designed to generate rapidly time varying beams, with different scan angles, beam shapes and directivities, in order to illuminate the respective fixed ground-based cell pattern. By way of example, a phased array antenna is employed on the communications platform, and the platform is configured to dynamically determine the appropriate beamforming coefficients or weights, over given time intervals, in order to generate time varying beam patterns that illuminate the respective fixed cells on the ground. Further, each fixed ground-based cell may be assigned a fixed frequency/polarization (F/P) pair. Accordingly, as the communications platform moves, it forms the communications beams to illuminate the respective uniform cell pattern, where each cell is assigned a respective F/P pair. As such, a ground terminal located within a given cell utilizes a constant F/P pair as long as the communications platform is within the necessary range to form the respective beam, and the data packets intended for that terminal are enqueued based on this F/P assignment. Such example embodiments thereby eliminate the requirement on the terminal for beam-to-beam handovers with respect to a given satellite (intra-satellite handovers). By way of further example, the satellites are configured to employ beam hopping to serve cells or beams sequentially.

Traditionally, in order for a phased array antenna to generate beams with time varying scan angles, beam shapes and directivities, the beamforming coefficients for each beam pattern would need to be computed on a real-time basis, which would require the implementation of a real-time beamforming processor on the satellite. The implementation of such a beamforming processor, however, would require additional components (increasing the weight and power requirements of the satellite/HAP) and would increase system complexity. According to further example embodiments, therefore, a methodology and algorithm for efficient computation of beamforming coefficients is provided that eliminates the need for such real-time computation of the beam coefficients on the satellite/HAP. According to one such embodiment, a set of beamforming coefficient vectors are precomputed to generate the desired beam scan angles, beam-widths and directivities within the field of view of the platform. The resulting data is compressed (to minimize storage requirements) and stored on the platform. Then, during flight, at any instant in time, the beamforming coefficient vector required to form a beam at a fixed size cell on the ground can be efficiently obtained by a simple interpolation of the precomputed beamforming coefficient vectors.

By way of example, a plane in the satellite-based antenna coordinate system is envisioned as being covered by a uniform grid of points. A beamforming coefficient vector is precomputed for each of these grid points, such that the coefficient vector creates a beam in the direction (i.e., scan angle) of the grid point with the desired beam shape and directivity. These precomputed grid beamforming coefficient vectors are compressed and stored in a storage device on the platform. As the communication platform flies over an earth based cell, the earth based coordinates of the cell center (i.e., latitude and longitude) are mapped to a point in the satellite-based antenna coordinate system plane mentioned above. The beamforming coefficient vector required to form the beam at the cell center is obtained by interpolating the precomputed beamforming coefficient vectors corresponding to the grid points nearest to the mapped cell center. Since the precomputed beam coefficient vectors were determined such that they create beams with the required scan, shape and directivity, the resulting interpolated coefficient vector produces the beam with the characteristics appropriate for the particular cell center. This process is repeated for all the cell centers at which beams need to be created. Further, as the spacing between the grid points becomes finer, interpolated beam comes closer to realizing the desired beam characteristics. According to a further example embodiment, the symmetry of the phased array geometry and cell patterns are utilized to minimize the amount of storage required to store the precomputed beam coefficients.

Such approaches for fixed ground-based cells, with fixed frequency/polarization (F/P) assignments to illuminate the respective ground cells, for example, achieve the following advantages: (a) Associated Routing—it is easier for the network to route packets intended for terminals addressed to the terminal cell location, which never changes, rather than to a beam in which the terminal is located only transiently; (b) simplified terminal and frequency planning, and simplified routing and addressing as each terminal is assigned a permanent address associated with the respective cell in which it is located; (c) more efficient for constant information rate (CIR) service—the cell in which a terminal is located is of a fixed size, which results in a constant bit rate density or bits per second per kilometer squared (whereas, in a conventional fixed beam system, because the cell sizes vary as the communications platform moves, the bit rate density of a cell varies)—and, as a result, Service Level Agreements (SLAs) are easier to satisfy/guarantee; (d) respective assignment of frequency/polarization pairs to the cells (based on a fixed n-color reuse pattern) results in a constant F/P assignment for each terminal based on its respective cell, and thus no intra-platform handover between fixed beams of a given satellite/HAP is required (whereas, in a conventional fixed-beam system, intra-platform beam handovers are required, which adversely affect the terminal); (e) the power flux density on the ground remains nearly constant; (f) when switching from a current platform to a new platform (inter-platform handover), while the terminal has to adjust timing and switch to the antenna of the new platform, the frequency and polarization assignments to the respective cell can remain constant from platform-to-platform (because the resource is assigned to the ground-based cell location and not to the moving beam); (g) a terminal with two antennas can receive packets from two different platforms at the same time for some overlapping period (when the two antennas have adequate directivity and when the platforms are far enough apart relative to the antenna pattern sidelobe discrimination); (h) easier compliance with applicable regulatory constraints of different regions to using (e.g., constraints regarding permitted frequency usage in the different regions)—when frequency is assigned to the cell (in a fixed ground-based cell system) such constraints can be easily avoided, however, when frequency is assigned to the beam (in a conventional fixed beam system) the assignments have to be continually updated as the satellite beams illuminate different regions having different respective regulatory constraints (such as International Telecommunications Union (ITU) regions).

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Figure 1:
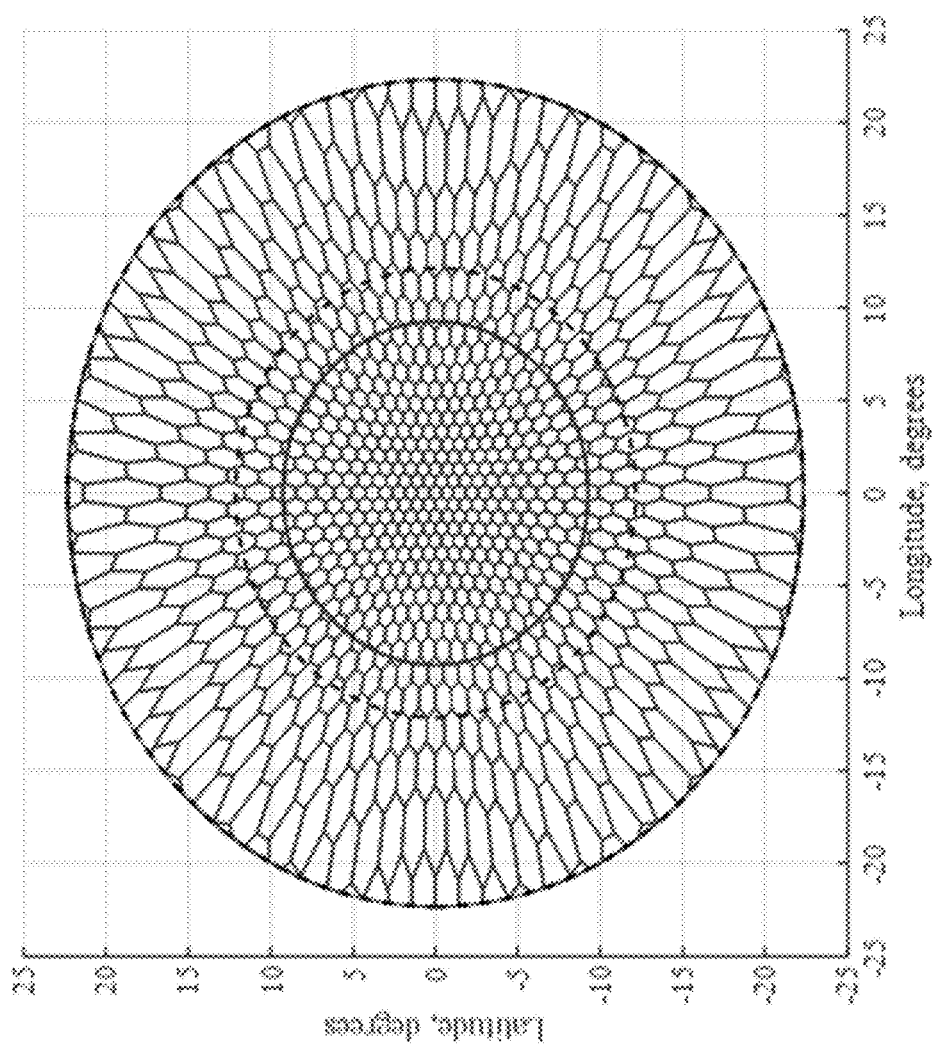
FIG. 1 illustrates a cell pattern on the ground as would be illuminated by a conventional antenna (e.g., phased array or reflector antenna) generating a fixed platform-based beam pattern.

Systems and methods for wireless communications systems (e.g., satellite communications systems) that employ spot-beam (or cell) patterns that are fixed with respect to the earth frame of reference (i.e., fixed ground-based beams), are described—where the communications platform generates dynamically varying beams that illuminate a uniform fixed beam or cell pattern on the surface of the Earth that remains uniform as the satellite platform moves over respective coverage areas on the surface of the Earth, or the HAPs platform changes its orientation with respect to its coverage area. The present invention is not intended to be limited based on the described embodiments, and various modifications will be readily apparent. It will be apparent that the invention may be practiced without the specific details of the following description and/or with equivalent arrangements. Additionally, well-known structures and devices may be shown in block diagram form in order to avoid unnecessarily obscuring the invention. Further, the specific applications discussed herein are provided only as representative examples, and the principles described herein may be applied to other embodiments and applications without departing from the general scope of the present invention.

Further, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Figure 2:
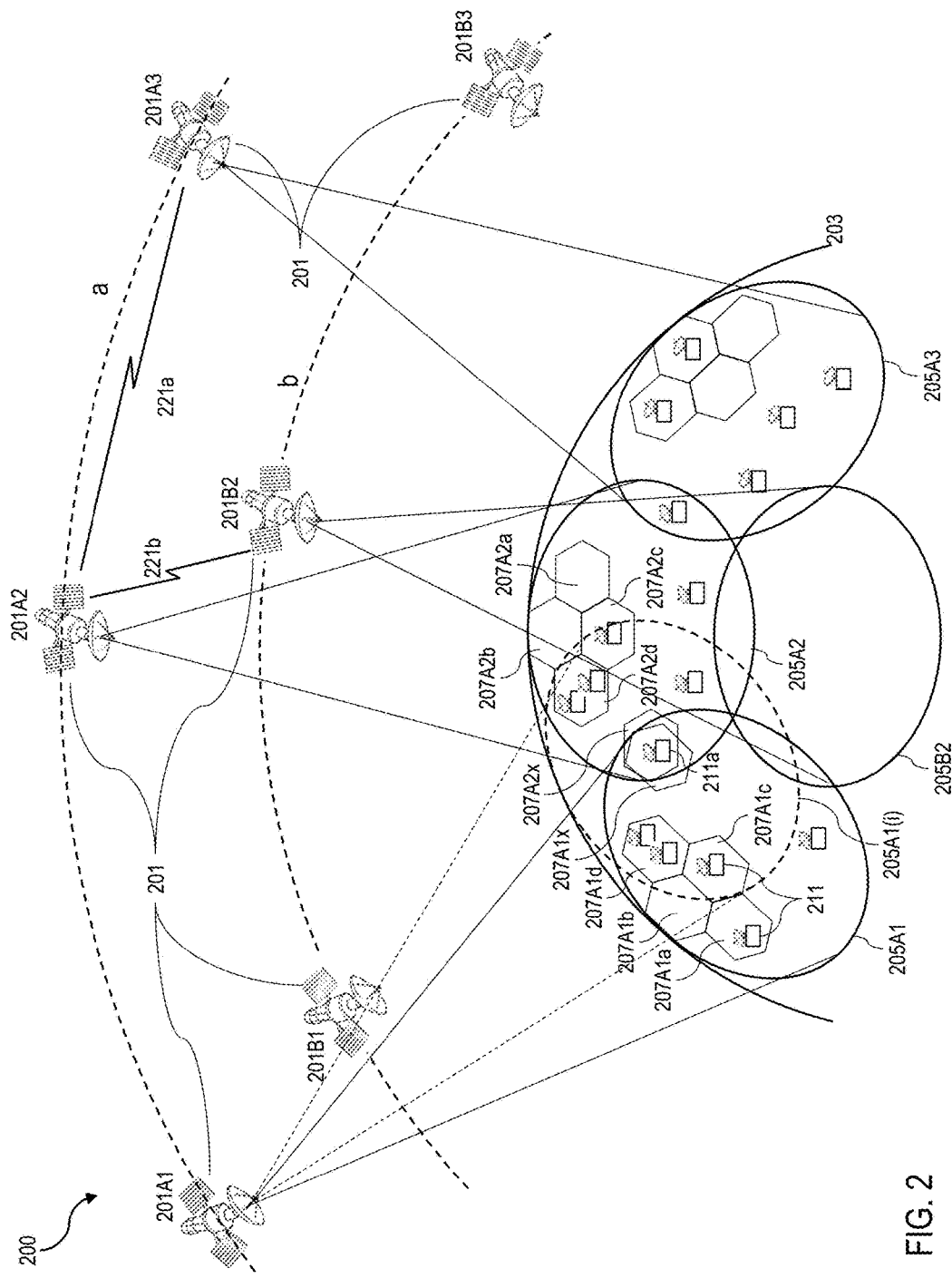
FIG. 2 illustrates an example wireless communications system (e.g., a LEO or MEO satellite system or a HAP system) for employing fixed ground-based beams, in accordance with example embodiments of the present invention.

FIG. 2 illustrates an example wireless communications system (e.g., a LEO or MEO satellite system or a HAP system) for employing fixed ground-based beams, in accordance with example embodiments of the present invention. While the following description of example embodiments of the present invention is in the context of a low earth orbit (LEO) satellite system, as would be appreciated, the aspects and concepts described herein would be applicable to any communications system employing one or more non-geosynchronous orbit (NGSO) airborne communications platforms that travel or move relative to the surface of the Earth (e.g., low earth orbit (LEO) satellite systems, medium earth orbit (MEO) satellite systems, and high altitude platform (HAP) based systems).

With reference to FIG. 2, the satellite communications system 200 includes a plurality of satellites 201, which may hereinafter be referred to as a constellation. The satellites of the constellation travel around the Earth 203 in different orbital planes, such as the orbital planes a and b depicted in FIG. 2. For example, the satellites 201A1, 201A2, 201A3 travel in the orbital plane a, and the satellites 201B1, 201B2, 201B3 travel in the orbital plane b (an orbital plane may also be referred to herein simply as a plane or orbit). By way of example, in an orbital plane, the satellites may be distributed at relatively even distances apart so that the angular position between each adjacent pair of satellites is substantially uniform, and the orbital planes may be highly inclined relative to the equator to provide global coverage (e.g., the angle formed between the orbital plane and the equatorial plane is greater than 70 degrees). By way of further example, the orbital planes may also distributed in a substantially uniform manner. A satellite 201, in accordance with example embodiments, employs a multiple beam antenna (e.g., a phased array antenna) that illuminates a respective geographic region or footprint on the surface of the Earth, such as the regions 205A1, 205A2, 205A3, 205B2 of the satellites 201A1, 201A2, 201A3, 201B2, respectively. As the satellite moves through its orbit, the footprint/beam moves across the surface of the Earth relative to the movement of the satellite. Each geographic region illuminated by a satellite antenna is further divided into spot beams or cells 207. Each spot beam or cell provides data communication services to the respective ground terminals 211 located within that cell. Further, each satellite also may employ one or more inter-satellite links (ISLs) providing for data communications between that satellite and neighboring satellite, such as the ISL 221a between the satellites 201A2 and 201A3 and the ISL 221b between the satellites 201A2 and 201B2. Further, each satellite may have one or more antennas (e.g., spot beam antennas, such as planar phased array antennas), where each antenna will radiate and cover a respective footprint area (e.g., a footprint area 205) on the surface of the Earth.

In further accordance with such example embodiments, while the beam/footprint of a satellite moves across the surface of the Earth relative to the movement of the satellite, the cells remain stationary or fixed (each satellite antenna continually adjusts the relative cell pattern of its respective beam to maintain a uniform cell pattern on the surface of the Earth—as the satellite moves, the satellite will continually service the cells of that cell pattern that are within the footprint of the satellite antenna beam). More specifically, considering the satellite 201A1 (for example), as the satellite travels through its orbit, the satellite will service the cells 207A1 (e.g., 207A1a, 207A1b, 207A1c, 207A1x, etc.) while those cells are within the footprint of the respective satellite antenna beam. Similarly, considering the satellite 201A2 (for example), as the satellite travels through its orbit, the satellite will service the cells 207A2 (e.g., 207A2a, 207A2b, 207A2c, 207A2x, etc.) while those cells are within the footprint of the respective satellite antenna beam. Further, at a certain point in time, for example, the cell 207A1x (within which the terminal 211a is located) will become positioned at the edge of the satellite antenna footprint 205A1, and the link margin for the services provided to the terminal 211a will diminish). By this point in time, however, the satellite 201A2 will have moved into a position where the cell 207A1x is now within the footprint of its antenna beam, and that cell can be transitioned to the satellite 201A2 for the duration of time that the cell is within the footprint of the satellite 201A2 (with the cell of the new satellite labeled in the Figure as 207A2x). Accordingly, from the standpoint of the terminal 211a, it remains in the same cell (the same frequency and polarization), but the communications services for the cell are transitioned from satellite to satellite (in this case, from the satellite 201A1 to the satellite 201A2). In order that the service to the terminal 211a is not interrupted, a handoff or handover will be performed transferring the service for the terminal 211a from the cell 207A1x of the satellite 201A1 to the cell 207A2x of the satellite 201A2 (effectively the same cell, with the same frequency/polarization pair, but serviced by the new satellite 201A2). In other words, as a satellite moves through its orbit (e.g., the satellite 201A1), the footprint of the satellite (e.g., the footprint 205A1) moves across the surface of the Earth servicing the fixed pattern of beams that is within the footprint at any given point in time. For example, at one point in time, the footprint of the satellite 201A1 will be positioned as the footprint 205A1, which will cover and service the cells (207A1 207A2a, 207A2b, 207A2c, 207A2x, etc.). Then, at a subsequent point in time, the footprint of the satellite 201A1 will be positioned as the footprint 205A1(i), where (for example) the cell 207A1a is no longer within the footprint, but the cell 207A2d is now within its footprint. Accordingly, at the subsequent point in time the satellite 201A1 will service the fixed pattern of cells within its footprint 205A1(i), for example, excluding the cell 207A1a and including the cell 207A2d.

With a traditional LEO satellite, the satellite antenna generates a fixed cell pattern within the antenna footprint according to the geometry and coefficients applied to the phased array antenna elements and based on the antenna coordinate system. As such, because the cell pattern is fixed relative to the antenna coordinate system, as the satellite travels in its orbit, the cell pattern moves across the face of the earth. Further, as the cell pattern moves across the face of the earth, the particular servicing a given terminal receives will change rapidly and the respective shape of each cell will vary relative to the angle of inclination of the satellite beam and the distance of the satellite from the earth (as the orbit of a satellite is not necessarily circular and is typically more elliptical in shape, and thus the angle of inclination of the satellite beam relative to the Earth and the distance of the satellite from the Earth changes throughout the orbital path). Accordingly, as mentioned above, with such a traditional LEO satellite, the frequency of handovers for a given terminal is relatively high. The satellite and satellite antenna, according to example embodiments of the present invention, instead generates dynamically varying spot beams that illuminate a fixed cell pattern on the surface of the Earth, which remains uniform as the satellite travels over respective coverage areas on the surface of the Earth. With such an approach, the particular cell servicing a given terminal receives remains constant for a substantially longer period of time, and thus the frequency of handovers is significantly reduced.

As described in further detail below, such example embodiments significantly reduce the complexity of a multi-beam antenna system that is configured to simultaneously generate multiple beams of rapidly time varying scan angles, beam shapes and directivities, which thereby provides a uniform ground-based cell pattern on the surface of the Earth. Further, such complexity reduction translates into a reduction in the size, weight and power requirements of the satellite/HAP.

Figure 3A:
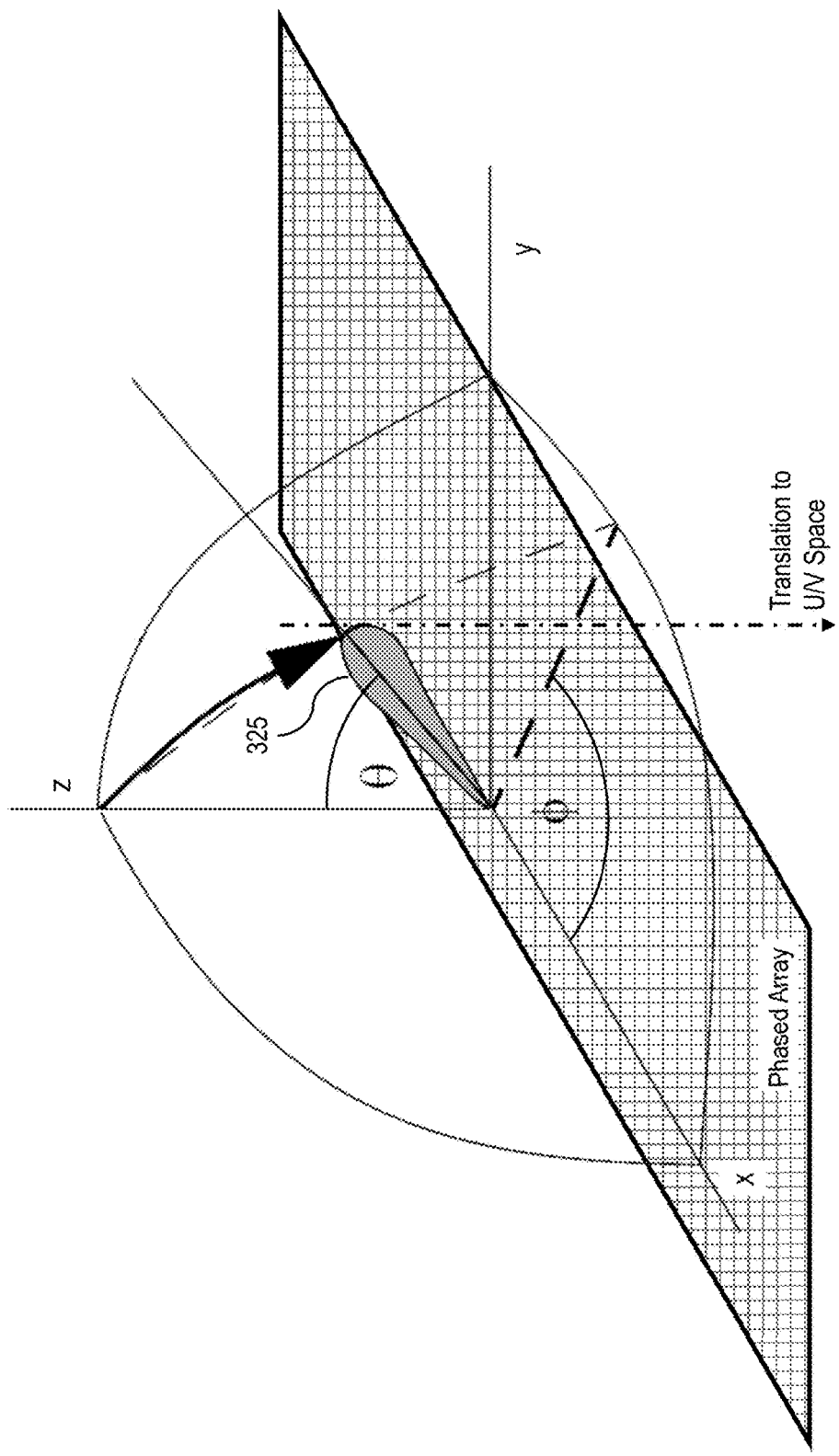
FIG. 3A shows the direction of the main lobe of a phased array antenna beam in terms of azimuth and elevation angles.
Figure 3B:
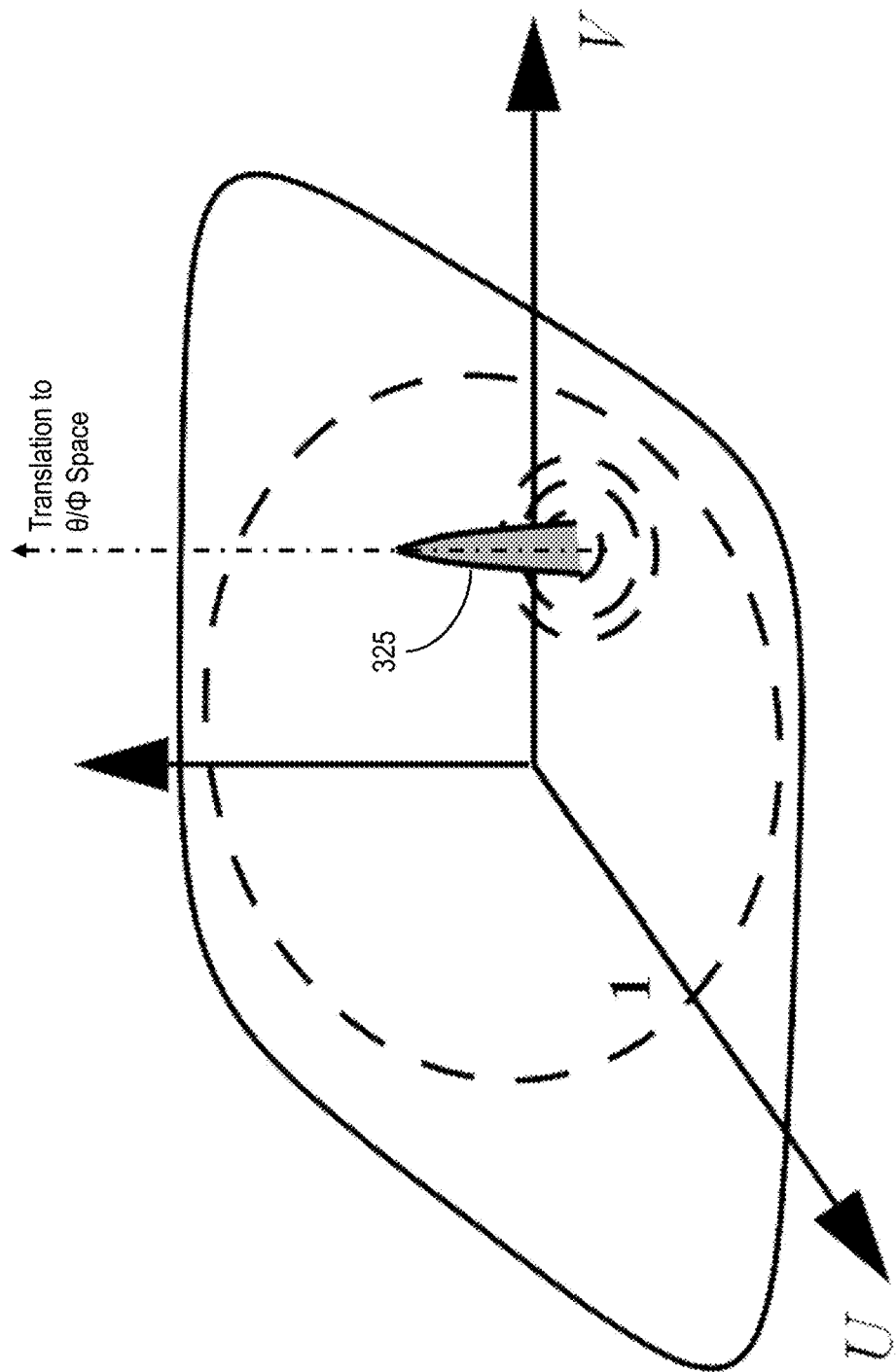
FIG. 3B shows the direction of the main lobe of the phased array antenna beam of FIG. 3A translated to the U/V space.

According to such embodiments, for example, the Earth-based cell centers are based on the geocentric coordinate system of the Earth, which may be defined by (x, y, z) coordinates relative to the center of the Earth or by latitude and longitude coordinates. Further, each cell of a satellite system is typically configured in a hexagon shape (delineated by the cell center and the six vertices of the hexagon). In that context, each cell may be specified by latitude and longitude points for the cell center and six vertices on the surface of the Earth. Whereas, the satellite antenna coordinate system is defined relative to the satellite antenna (typically with the center of the antenna as the origin of the antenna coordinate system). In this example, a planar phased array antenna is contemplated, however, the same concepts and aspects of such example embodiments may also be applied to other types of beam forming antennae. In order to form a beam to illuminate a ground-based cell specified in terms of latitude and longitude coordinates for the cell center and six vertices, the geocentric coordinates of the cell are translated or converted to coordinates in the antenna coordinate system. This translation defines the pointing (or the scanning) of the beam relative to the phased array, which can then be used to compute the appropriate beam coefficients to apply as weights to the phased array element signals to generate the respective beam signal. As would be appreciated by one of skill in the art, the beamforming coefficients include phase shifting coefficients to control the directivity or direction of the beam, and amplitude coefficients to effectively control the shape of the beam. By way of example, the antenna coordinate system may also be defined by (x, y, z) coordinates relative to an origin point (e.g., the center of the antenna), or in terms of azimuth ($\theta$) and elevation ($\phi$) angles, as shown in FIG. 3A. FIG. 3A shows the direction of the main lobe 325 of a phased array antenna beam in terms of the azimuth and elevation angles ($\theta$, $\phi$). Alternatively, it is very common to express the ability of a planar array to steer a beam in space in terms of the (U, V) space as opposed to the angles ($\theta$, $\phi$)—the U and V coordinates effectively are functions of $\theta$ and $\phi$. FIG. 3B shows the direction of the main lobe 325 of the phased array antenna beam of FIG. 3A translated to the U/V space. In other words, the latitude and longitude points that define a particular cell of the fixed ground-based cell pattern on the surface of the Earth determine the beam angles ($\theta$, $\phi$) relative to the phased array antenna required to illuminate the respective cell, and the relative beam angles determine the appropriate beamforming coefficients that must be applied to the elements of the phased array to generate the respective beam to illuminate the respective cell. Further, the beamforming coefficients determination also takes into account the beam-width and directivity that is required to illuminate the earth based cell so that the desired cell center and edge of cell beam gain characteristics are realized.

The underlying concepts associated with the mechanics of beamforming utilizing a phased array antenna are not described in detail herein, as such concepts are well known in the art. For example, as would be understood by one of ordinary skill in the art, with a phased array antenna, multiple beams can be simultaneously generated by applying multiple weight vectors in parallel to the element signals. Each of these weight vectors applies distinct phase shifts to the element signals, computed so that only signals from (or to) a specific direction combine coherently in phase, resulting in a beam formed in that direction. Further, the aspects of the present invention, and the concepts of the example embodiments described herein, apply irrespective of the detailed implementation of the phased array antenna. Accordingly, while the constraints applicable to phased array antenna design (e.g., size and weight constraints of the respective satellite, the trade-offs between the spacing of the phased array elements and corresponding interference effects, the desired width of the beams, the desired number of beams, power constraints, etc.) will govern the ultimate phased array implementation, the aspects of the present invention, and the concepts of the example embodiments described herein, apply to or overlay that ultimate phased array design.

Figure 4A:
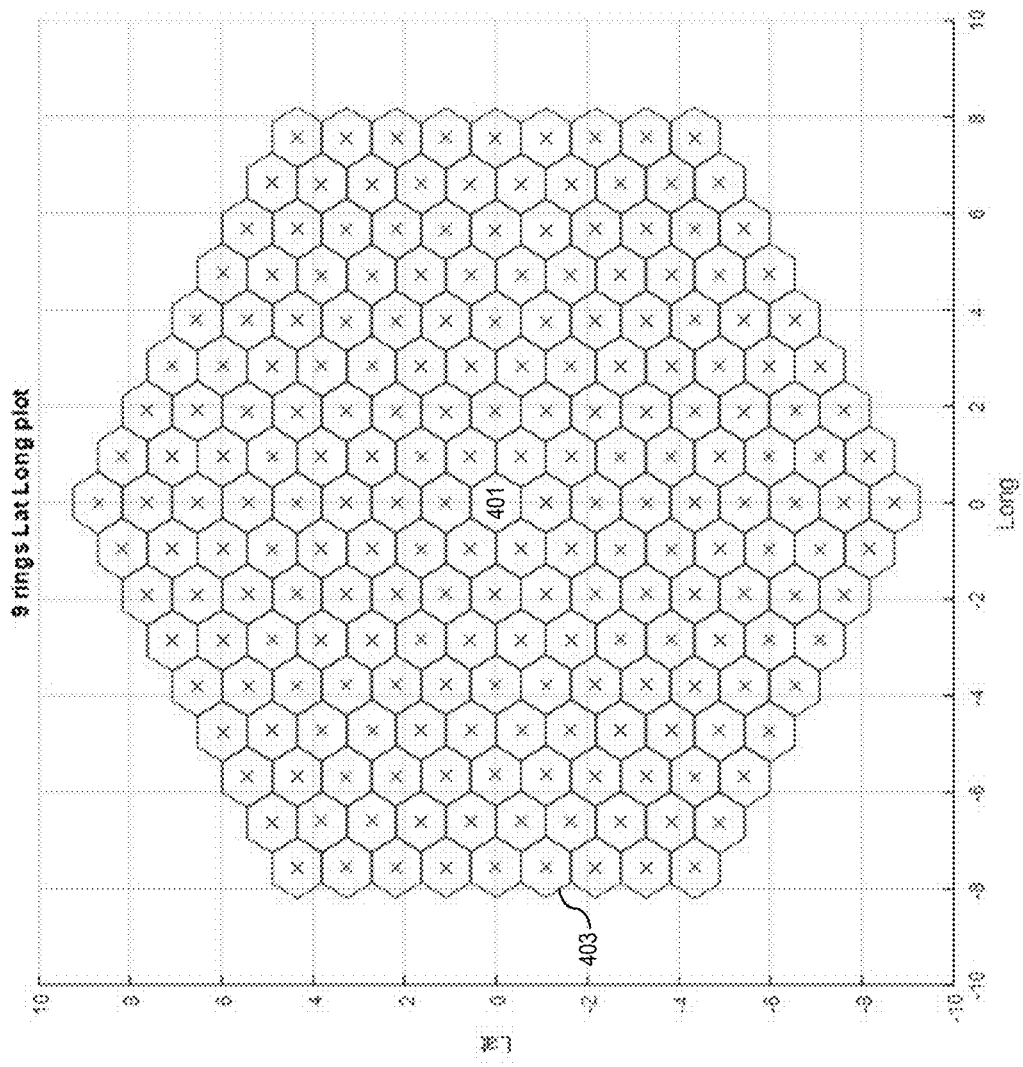
FIG. 4A shows a pattern of 9 rings of uniform hexagonal cells illuminated in the Latitude/Longitude space of the surface of the Earth, in accordance with example embodiments of the present invention.
Figure 4B:
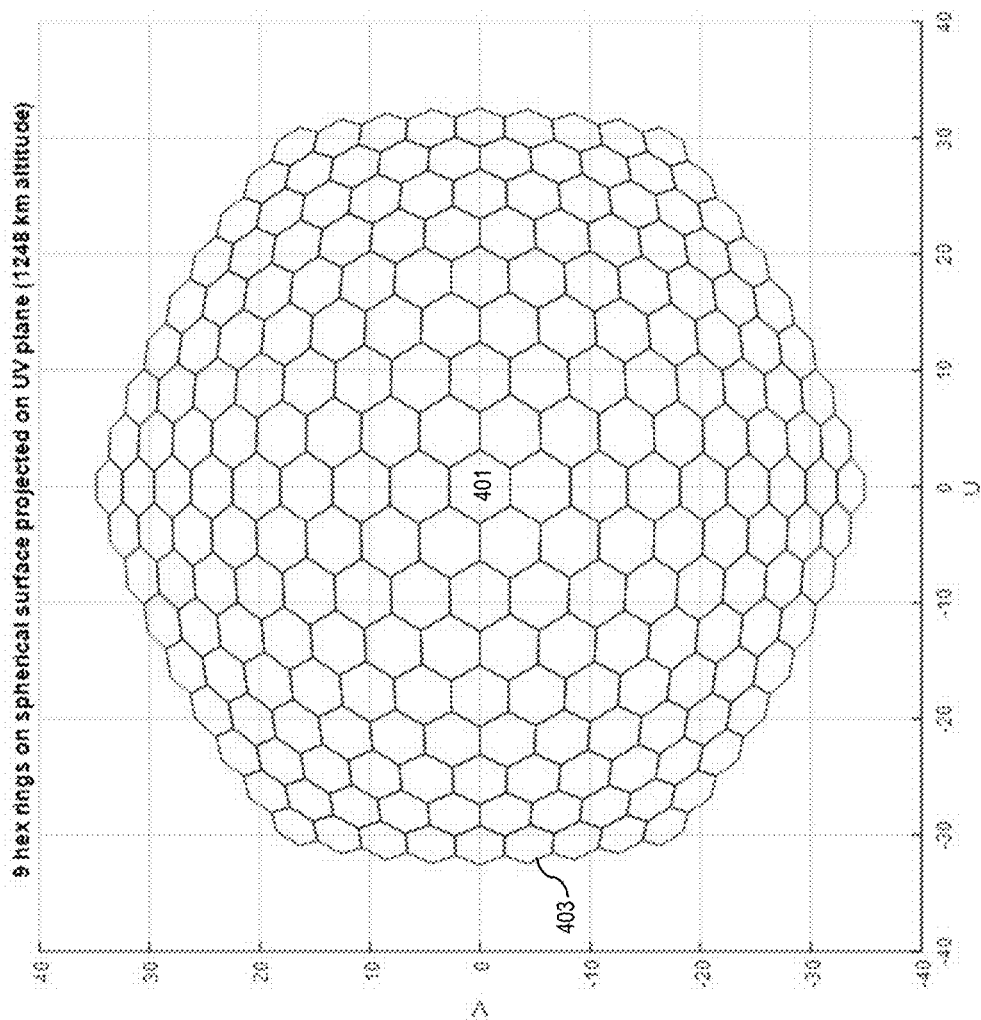
FIG. 4B shows the pattern of 9 rings of uniform hexagonal cells (of FIG. 4A) translated onto a spherical surface projected on a U/V plane (e.g., at 1248 km altitude), in accordance with example embodiments of the present invention.

FIG. 4A shows a pattern of 9 rings of uniform hexagonal cells illuminated in the Lat/Long space of the surface of the Earth the y-axis being the Longitude and the x-axis being the Latitude), and FIG. 4B shows the pattern of 9 rings of uniform hexagonal cells (of FIG. 4A) translated onto a spherical surface projected on a U/V plane (e.g., at 1248 km altitude), in accordance with example embodiments of the present invention. In the illustrations of FIGS. 4A and 4B, the satellite or HAP is directly above the center cell 401.

With reference to FIG. 4A, as described above, the fixed ground-based cells in the Lat/Long space on the surface of the Earth are of a uniform size and hexagonal shape. By way of example, a ground terminal (user terminal) is located and commissioned in a particular cell on a relatively permanent basis (the terminal remains in that cell until relocated and recommissioned in the system in a different cell. By way of further example, when the terminal is commissioned in a particular cell, the network administration assigns the cell ID (the ID of the respective cell in which the terminal is located) as the media access control (MAC) address used by the network to address and route data packets to that terminal. Further, as also described above, as the satellite travels above this geographic region of the Earth, or as the HAP flies a figure eight or circular or linear pattern, the platform antenna maintains the same uniform cell pattern in the Lat/Long space on the surface of the Earth.

With reference to FIG. 4B, with the translation of the cell pattern of FIG. 4A to the U/V space of the satellite antenna, the beam required to illuminate the cell 401 is significantly wider than the beam required to illuminate the cell 403 at the edge of the cell pattern. In other words, to maintain a fixed ground-based cell, the beam width changes depending on the location of the cell within the cell pattern (at any given point in time, a cell at one location within the cell pattern may be at a distance from the satellite antenna and an angle of illumination relative to the satellite antenna that differs from a cell at a different location within the pattern). Accordingly, as the satellite moves, the beam width and radiation angle required to maintain the same uniform size and shape of a fixed ground-based cell continually changes in azimuth and elevation or in the respective U/V coordinates of the satellite antenna. For example, as a LEO satellite moves over the coverage area, the fixed geocentric or ground-based cells are transformed into cells of varying size, shape and radiation angle in the field of view (FOV) of the satellite antenna. Further, the satellite antenna is able to "see" a particular cell only during a respective period of time while that cell is within the FOV of the satellite antenna. When a cell initially becomes visible at the initial or leading edge of coverage (EOC) of the satellite antenna, it requires a narrow beam at a high scan angle. The beam width then progressively increases and the scan angle decreases until the cell is directly under the satellite antenna FOV. Then, as the satellite moves away from the cell, the beam width again decreases and the scan angle increases until the cell is no longer visible (just beyond the trailing EOC of the satellite antenna).

As such, in order for the phased array to generate a beam required to maintain the same uniform size and shape of a respective cell in the Lat/Long space on the surface of the Earth, the beamforming coefficients applied to the phased array would have to be continually adjusted based on the instantaneous location of the satellite (the beam-former would have to continually change the size, shape and scan angle for the cell to remain uniform). This can be accomplished by continuously re-computing the beamforming coefficients applied to the beam former, depending on the geocentric location of the cell relative to the satellite. Such real time re-computation of the beamforming coefficients would require significant processing power on the satellite. The complexity of such an approach, however, would have significant negative impacts on the cost and reliability of the system (assuming such continual beam re-computation and adjustment were even possible in the context of practical operation of the system). Instead, according to one embodiment, the beam generation is adjusted at a frequency required to maintain the communications links for the terminals throughout the cell pattern. In that regard, according to example embodiments, the frequency at which the satellite adjusts the beam pattern will depend on the level of interference experienced between beam adjustments (which will depend on the frequency reuse pattern and the relative distance to other beams using the same frequency) and the ability of the terminals within each cell to close the link and successfully perform a respective data communications, which in turn will depend at least in part on the velocity of the satellite. By way of example, for a given cell, the beam generated by the satellite antenna to illuminate that cell can remain constant so long as the terminals within that cell (including those terminals along the edges of the cell) receive a strong enough signal to close the communications link with the satellite.

Accordingly, the frequency of beam adjustments for a given system can be designed based on the various trade-offs associated with such systems. For example, from the standpoint of link budgets and an ideal frequency reuse plan, beam adjustments would be performed at a relatively high frequency. On the flipside, however, in order to minimize the processing power and other associated functionality required on the satellite, the beam adjustments would be performed at a relatively low frequency (which would come at the expense of system performance relative to the data communication services provided to the respective terminals). According to example embodiments, therefore, the beam adjustment frequency is set based on a link budget design and frequency reuse plan such that the terminals within a given cell can tolerate the degradation of the respective beam while still being able to close the communications link with the satellite. In other words, the beam adjustment frequency is based in part on a trade-off between the link budget design and the frequency reuse plan (in terms of the distance between a given cell using a particular frequency/polarization and the nearest cells using that same frequency/polarization)—as the distance between a given cell using a particular frequency/polarization and the nearest cells using that same frequency/polarization increases, the terminals in that cell can tolerate a greater the signal loss (to a point), whereas increasing the distance between a given cell using a particular frequency/polarization and the nearest cells using that same frequency/polarization can result in a more inefficient frequency reuse plan and an associated sacrifice in available system capacity.

According to further example embodiments, approaches are provided that eliminate the need for such real-time or high frequency computation of the beamforming coefficients on the satellite. According to one such approach, matrices of precomputed beamforming coefficients can be stored on the satellite. For example, such a matrix can store the required beamforming coefficients to generate a beam relative to the ground-based cell coordinates of a particular cell, translated to the satellite antenna coordinate system, for different positions of the satellite while that ground-based cell is within the FOV of the satellite antenna. Based on virtually endless combinations of beamforming coefficients for the various fixed ground-based cells and potential satellite positions, however, the storage requirements and satellite could increase exponentially.

Accordingly, in order to address the relatively large storage requirements of such an approach, further approaches are provided whereby the satellite is not required to perform real-time computation of the beamforming coefficients that generate beams at the latitude and longitude coordinates that define a particular cell. According to one such embodiment, the FOV of the phased array antenna is considered as a plane containing a grid of points in the antenna coordinate space. For each grid point, a beamforming coefficient vector is precomputed and associated with the respective grid point, where the beamforming coefficient vector is computed such that the resulting beam will point in a direction based on the grid point (e.g., in the antenna coordinate system) and achieve the desired beam-width and directivity. In other words, a grid point corresponds to a (U,V) point (see, e.g., FIG. 3B), which in turn corresponds to a beam direction ($\theta$, $\phi$) (e.g., as shown in FIG. 3A). Further, the (U,V) point also determines a beam width according to FIG. 4B, which in turn determines a beam directivity. Thus, each grid point is associated with a beam direction, width and directivity. Based on these specifications, a beamforming coefficient vector that generates a beam meeting these specification in the direction of ($\theta$, $\phi$) can be computed using any of a number of beamforming algorithms that are well known to those familiar with the art. When the satellite/platform is in such an orbital position that a geocentric cell center coincides with a grid point, the beam coefficient vector of that grid point generates the desired beam at that cell center. However, in general, a cell center will not coincide with any of the grid points for an arbitrary position of the platform. In this case, by interpolating the beam coefficient vectors corresponding to the set of grid points nearest to the cell center (U,V), an approximate beam coefficient vector can be determined, to generate a beam at the cell center. The characteristics of this beam deviate from the desired beam for that cell, if the grid is coarse (i.e., spacing between grid points is high compared to the spacing between cell centers). However, as the grid becomes finer, (i.e., as the grid spacing becomes much smaller relative to the spacing between cell centers), this approximation improves. By selecting the grid spacing appropriately, cell center beams can be generated to the desired accuracy using this technique of interpolation of precomputed grid beam coefficient vectors. The beam coefficient vectors for all the grid points are precomputed and stored in non-volatile storage on the satellite. Since the grid points are defined in the satellite antenna coordinate system, their respective positions do not vary over time and travel of the satellite, and thus the respective beam forming coefficient vectors are non-time-varying or constant.

Further, in operation, based on any given position of the satellite, the stored beamforming coefficient vector for a particular beam can be used to generate a beam that translates to a respective ground-based cell (defined by its cell center). By way of example, considering a particular satellite position, to generate a beam to illuminate a specific fixed ground-based cell within the FOV of the satellite antenna, the geocentric coordinates (e.g., Lat/Long coordinates) for the center of the specific cell are translated into the antenna coordinate space, and the beamforming coefficient vector for the grid point that is closest to the translated cell center is used to form the desired beam. Accordingly, since the beamforming coefficient vectors are precomputed and stored for the respective beams of the grid points, and the desired fixed ground-based cell is translated to the optimal grid point in the antenna coordinate system, real-time computation of the beam coefficients is no longer required, which significantly reduces system complexity (from the standpoint of both required processing power and hardware complexity which translates into increased component and weight requirements. The performance of such a "grid-based" beam will depend on the granularity or resolution of the predefined grid in the coordinate space of the satellite antenna. As the resolution of the grid increases (as the dimensions or number of points of the grid increases, a resulting beam generated based on the respective beamforming coefficient vectors will approach an optimal beam that is coincident with the direction and shape of the desired specific fixed ground-based cell. However, since the required storage increases linearly with the grid dimensions or number of grid points, the resolution of the grid presents a trade-off between the achievable performance and the storage requirements on the satellite.

Accordingly, in order to improve performance of the "grid-based" approach without unnecessarily increasing the storage requirements on the satellite, according to further example embodiments, an approach is provided whereby the desired beamforming coefficient vector for a particular fixed ground-based cell is interpolated based on the beamforming coefficient vectors of the grid points that are closest to the translated cell center coordinates for the respective fixed ground-based cell. According to one such embodiment, a bilinear interpolation is performed based on the beamforming coefficient vectors of the four closest grid points surrounding the point on the grid associated with the translated cell center coordinates for the desired fixed ground-based cell. A bilinear interpolation is an extension of linear interpolation for interpolating functions of two variables (e.g., x and y) on a two-dimensional grid. A linear interpolation is first performed in one direction (e.g., in the x direction), and is then performed in the other direction (e.g., in the y-direction). Accordingly, to a certain extent, this interpolation approach enables an increase in the achievable performance without increasing the granularity of the satellite antenna grid space. Further, with regard to the degree to which interpolation fails to meet a performance increase commensurate with the performance increase of a higher resolution grid, computer simulations can be performed to compare the respective trade-offs and arrive at an optimal solution or implementation. As would be apparent to one of skill in the art, at some point, the performance improvement achievable by further increases in the granularity of the grid will not be significant enough to warrant the added storage costs for the additional beamforming coefficient vectors.

Figure 5A:
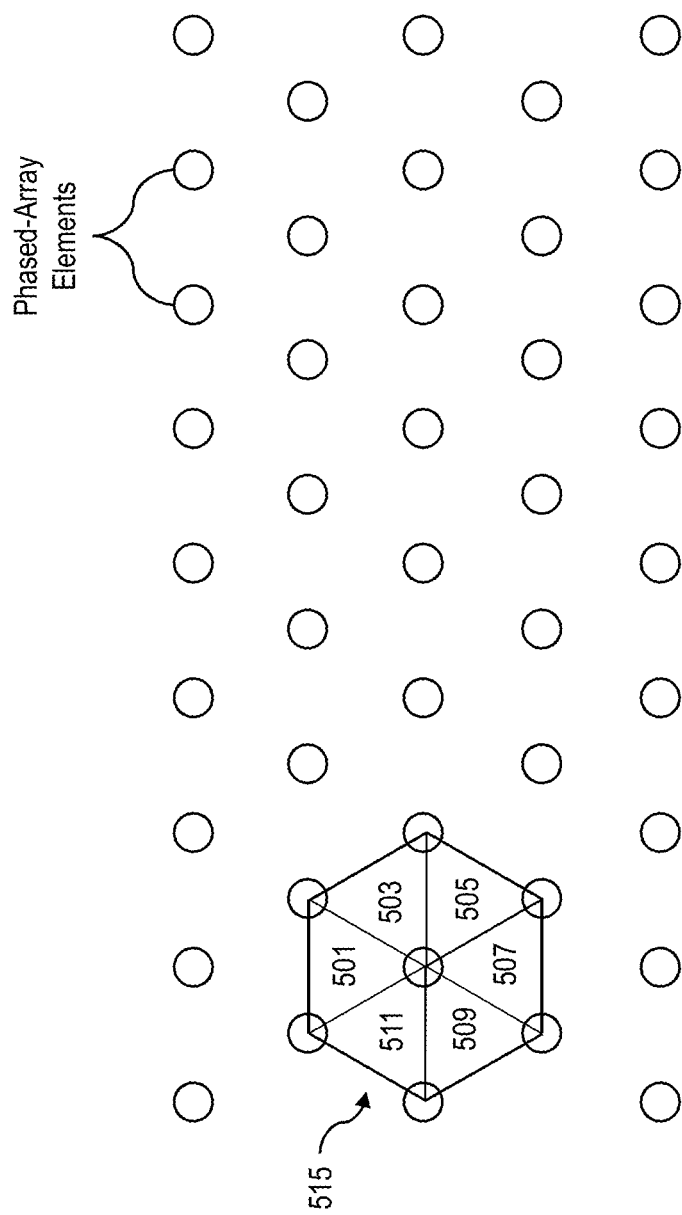
FIG. 5A illustrates the hexagonal geometry of the individual satellite/HAP antenna planar phased array elements arranged in a triangular lattice structure, in accordance with example embodiments of the present invention.
Figure 5B:
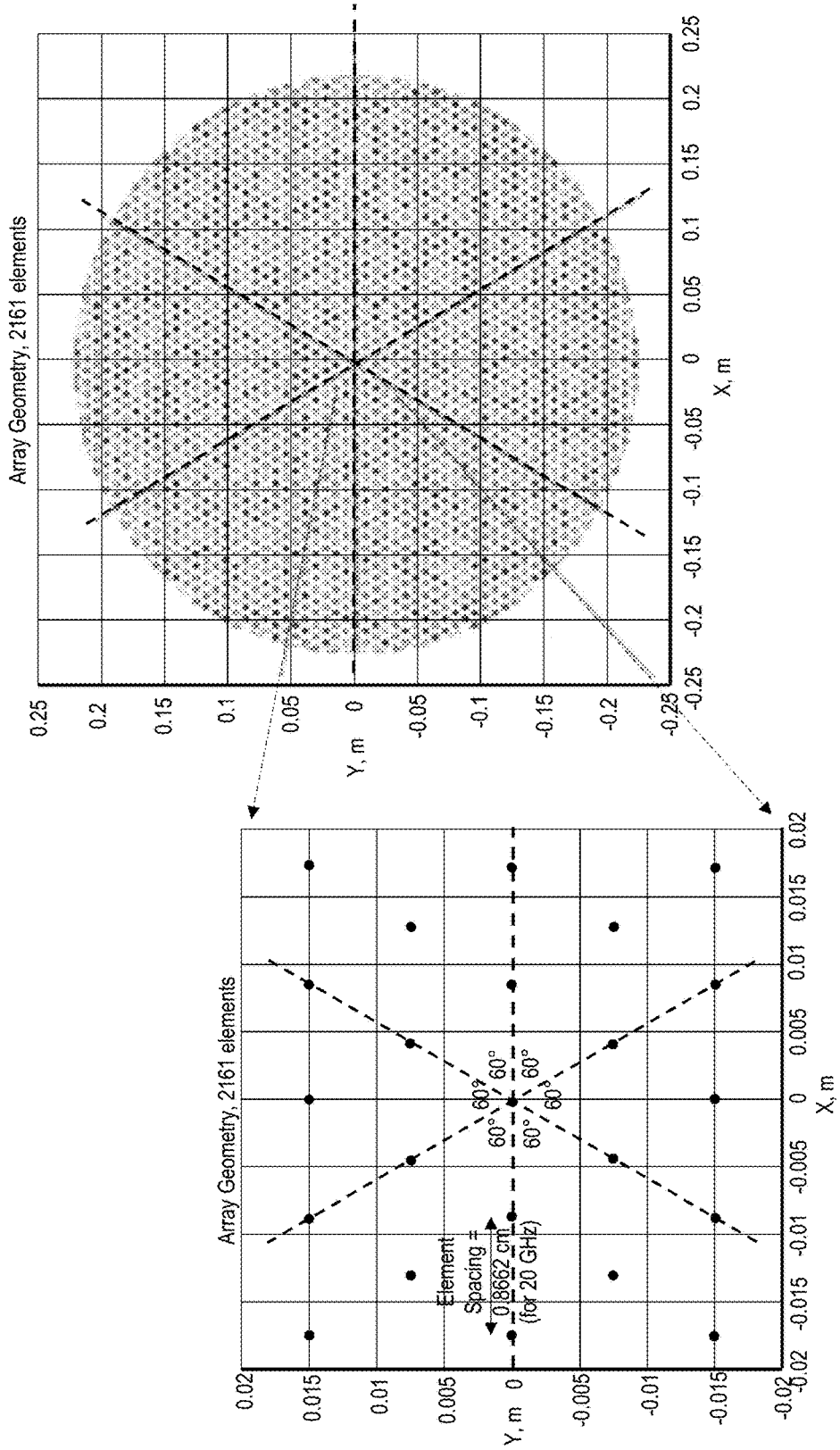
FIG. 5B illustrates an example phased array antenna design to form the beams required to illuminate the ground based cells, in accordance with example embodiments of the present invention.
Figure 5C:
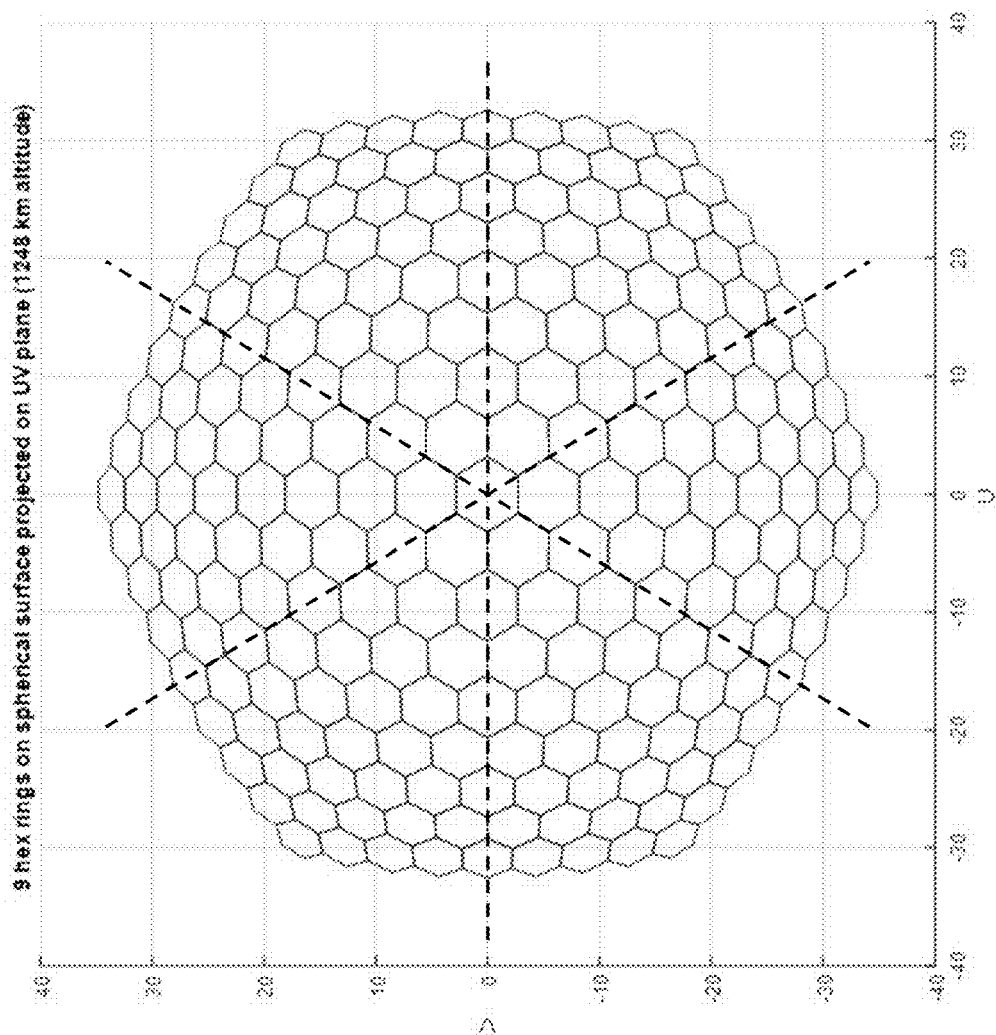
FIG. 5C illustrates the pattern of uniform hexagonal cells of FIG. 4B divided into the six sectors, in accordance with example embodiments of the present invention.

In order to further reduce the storage requirements on the satellite, according to further example embodiments, an approach is provided whereby symmetries in the antenna array geometry and cell layout are exploited to reduce the number of beamforming coefficient vectors that need to be stored on the satellite. Conventionally, the most common element arrays are of either a rectangular or a triangular geometry. Further, because an equilateral triangular lattice structure minimizes the number of elements needed for a given grating lobe free scan region, such a geometry reflects the most efficient array geometry for planar phased array antennas. FIG. 5A illustrates the hexagonal geometry of the individual satellite/HAP antenna planar phased array elements arranged in a triangular lattice structure, in accordance with example embodiments of the present invention. As can be seen from FIG. 5A, groups of six contiguous triangular lattices (e.g., the six triangular lattices 501, 503, 505, 507, 509, 511) for the hexagon shape 515. As can be seen from FIG. 5A, the triangular lattice structure exhibits a hexagonal symmetry. Consequently, the array elements can be grouped into 6 sectors as shown in FIG. 5B, which illustrates an example phased array antenna design to form the beams required to illuminate the ground based cells. If we take the (x, y) coordinates of any element in one sector and apply rotations of 60, 120, 180, 240 and 300 degrees about the origin (0,0), we obtain the (x, y) coordinates of the identically situated elements in the five other sectors. From phased array theory, it is well known that the beamforming coefficients are determined jointly by the element coordinates (x, y) and the desired scan direction of the formed beam. Thus if two scan directions differ by an integer multiple of 60 degrees, then the corresponding beamforming coefficients are rearranged (or rotated) versions of each other. In other words, given the beamforming coefficient vector W for forming the beam at a scan angle $(\theta_0, \phi_0)$, the beamforming coefficients for forming the beams at $(\theta_0, \phi_0+60)$, $(\theta_0, \phi_0+120)$, $(\theta_0, \phi_0+180)$, $(\theta_0, \phi_0+240)$, $(\theta_0, \phi_0+300)$ can be obtained by simply rearranging the weights in W. Thus, it is only necessary to store the beamforming coefficients corresponding to ⅙ of the grid points, reducing the storage requirements by a factor of 6 resulting in significant savings in storage requirements. FIG. 5C illustrates the pattern of uniform hexagonal cells of FIG. 4B divided into the six sectors.

According to further example embodiments, a further reduction of required storage can be achieved by exploiting a property of the phases of the beam weight coefficients. By way of example, a plane wave front arriving from a scan direction $(\theta_0, \phi_0)$ has a relative phase shift at the $n^{th}$ element that can be expressed as:

$$(2\pi/\lambda)[X_n \sin\theta_0 \cos\phi_0 + Y_n \sin\theta_0 \sin\phi_0]$$

where $[X_n, Y_n]$ is the position of the $n^{th}$ element in the planar phased array and $\lambda$ is the wavelength. The phase of the complex weight coefficient is the negative of the above phase to align the phases for the scan ($\theta_0$, $\phi_0$).

Further, since $\sin \theta_0$ is common to both terms in the square brackets, Phase$_0$ can be expressed as:

$$\text{Phase}_0(n) = (2\pi/\lambda)(\sin \theta_0)[X_n \cos \phi_0 + Y_n \sin \phi_0]$$

So if we save a "reference phase" as:

$$\text{Phase}_{ref}(n) = (2\pi/\lambda)[X_n \cos \phi_0 + Y_n \sin \phi_0],$$

then the Phase$_1$(n) can be determined for any other scan angle ($\theta_1$, $\phi_0$) as:

$$\text{Phase}_1(n) = \text{Phase}_{ref}(n) * \sin \theta_1,$$

where, the multiplier $\sin \theta_1$ is a scalar, and is thus independent of n.

In that context, according to further example embodiments, a table of reference phase vectors for a single $\theta_0$ and a scalar table of $\sin \theta$ values, can be stored on the satellite, based on which the phase vector for any other $\theta$ can be derived by multiplying a reference phase vector by a scalar. This achieves a further significant reduction in storage requirements.

In general, the grid can be rectangular or polar, and can be in the antenna UV plane or the antenna ($\theta$, $\phi$) plane. Further, the grid resolution may vary across the antenna plane. For example, near the origin (corresponding to Nadir), the grid can be coarse since beam widths are broader in that region. The grid becomes progressively finer approaching the edge of the antenna FOV, because narrower beams are required near the edge. A polar grid may be the most natural structure in order to exploit the symmetries of the hexagonal layout, but other grids are not precluded.

To illustrate the storage requirements, an example for the case of a 2161 element phased array antenna, which is required to scan to 40 degrees in $\theta$ and 360 degrees in $\phi$, is as follows:

1. ($\theta$, $\phi$) Reference Phase Vectors:

⅙-th of the hexagon spans 60 degrees. Assuming 0.2 degree steps, there are 60/0.2=300 axial angle steps within 60 degrees. Assuming 8 bits/phase value, there are 300*2161*8/8=648 KB to store the 300 phase vectors. One byte per phase value is used since we need to multiply this with sin(theta 0), to prevent loss of accuracy.

Then, if we need to scan to about 40 degrees in $\theta$ (e.g., in steps of 0.2 degrees), a table of 200 $\sin \theta$ scalar values will be required over the range $0 \leq \theta \leq \pi/2$. At 1 byte/value, this results in 200 Bytes.

So a total of 648 KB is required for phase table/frequency band.

Need to perform 2161 multiplies to derive the phase vector for an arbitrary $\theta$.

2. Amplitude Coefficients:

There are 300 axial angle steps (from above). 40 degree scan angle divided into 0.2 degree radial steps equals 200 radial ($\theta$) steps. Then (300*200)*2161*⅜=4.86 MB for amplitude table/frequency band.

Accordingly, a total of 4.86+0.648≅5.51 MB/freq. Band/transmit or receive for both amplitude and phase.

Figure 6A:
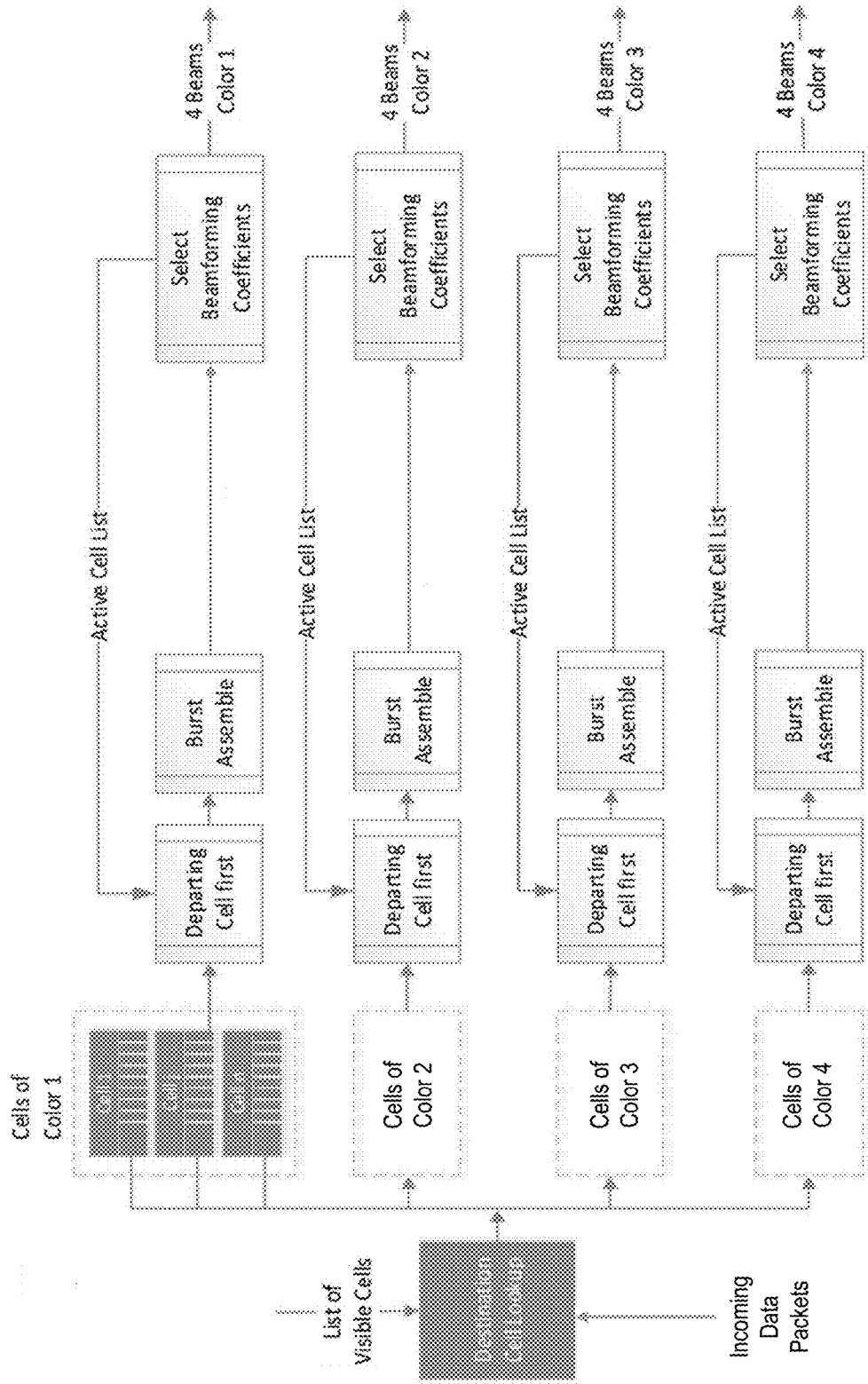
FIG. 6A illustrates a block diagram of the data packet processing and transmission on the satellite/HAP, in accordance with example embodiments of the present invention.
Figure 6B:
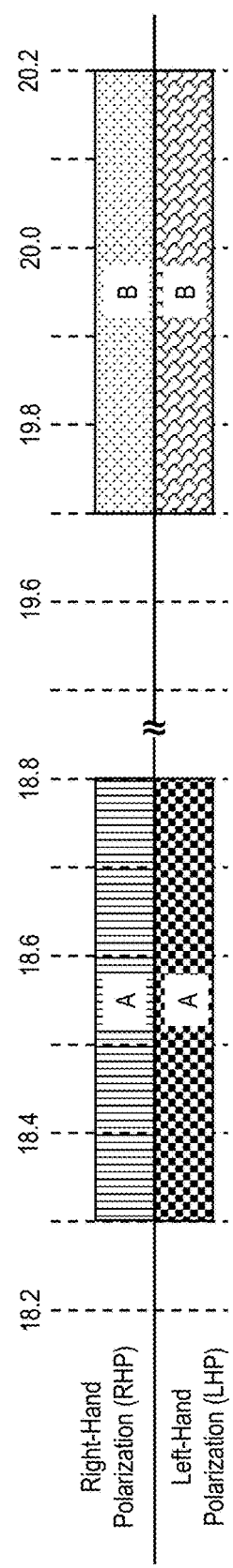
FIG. 6B shows an example of a conventional frequency spectrum and polarization plan in the Ka band for the four color reuse approach depicted in FIG. 6A.

FIG. 6A illustrates a block diagram of the data packet processing and transmission on the satellite/HAP platform, in accordance with example embodiments of the present invention. As described above, the cell ID of the respective cell in which each ground-based or user terminal is located is assigned to the respective terminal as its MAC address, which is used by the network to address and route data packets to that terminal. The satellite/HAP comprises buffers or queues corresponding to the respective ground-based cells. According to the embodiment depicted in FIG. 6A, the queues corresponding to respective cells are grouped based on the frequency reuse pattern of the platform. More specifically, the queues for the cells of the particular color (e.g., frequency and polarization) are grouped together. FIG. 6A shows an example of a four color reuse plan, for example, with two different frequency bands and two different polarizations. Further, FIG. 6B shows an example of a conventional frequency spectrum and polarization plan in the Ka band for the four color reuse approach depicted in FIG. 6A, where the color 1 reflects the right hand polarization for the Ka frequency band A, color 2 reflects the right hand polarization for the Ka frequency band B, color 3 reflects the left hand polarization for the Ka frequency band A, and color 4 reflects the left hand polarization for the Ka frequency band B. As further shown in FIG. 6A, the queues for the cells 1, ..., j, n of the color 1 are grouped together within the respective dashed box. Then, for each received incoming data packet, the satellite/HAP performs a destination cell look up (based on the MAC address to which the packet is destined) to verify that the destination cell is within the current list of visible cells of the satellite/HAP (the list of cells within the FOV of the antenna). The packets are then buffered in the appropriate queue based on the destination cell ID (the destination MAC address). The packets are dequeued in a determined order based on various factors, such as whether any of the queues are approaching capacity (in order to prevent a queue from overflowing), and whether there are packets buffered in a queue associated with a cell that is departing from within the FOV of the antenna. The bursts destined for each cell of the particular cell color are assembled with the respective dequeued packets destined for that ground-based cell. The appropriate beamforming coefficients are selected based on the antenna grid points that match up to the respective cell centers, and the beams for the respective cells are generated accordingly.

By way of example, consider a fixed ground-based cell covering New York City. The cell ID, and respective beam color (frequency and polarization) for that cell will always remain constant with regard to the beam from any satellite antenna that is to illuminate the New York City cell. Accordingly, when the New York City cell is within the FOV of a given satellite, the satellite will buffer the incoming data packets destined for New York City cell in the respective cell queue. As the satellite dequeues the packets destined for New York cell, it will assemble the respective bursts with the dequeued packets. Accordingly, all the packets buffered in any satellite queue associated with the New York City cell, based on the destination MAC address of the packets, will be assembled into the respective bursts and transmitted via a beam formed to illuminate the New York City cell (when the New York City cell is within the FOV of the respective satellite antenna). Then (as described above), based on the location of the satellite and the translation of the geocentric coordinates for the cell center to the satellite antenna coordinate system, the satellite will select the antenna grid point closest to the translated cell center coordinates and generate the respective beam based on the beamforming coefficient vector associated with that closest grid point. Alternatively, if interpolation is employed (as also described above), the satellite will interpolate the appropriate beamforming coefficient vector based on the four closest grid points surrounding the translated cell center.

The example of FIG. 6A also presupposes that the satellite antenna (based on respective constraints, including power, antenna design, etc.) can generate only 4 beams of each color at one time. Accordingly, conventional beam-hopping approaches could be applied across all the visible cells within the satellite antenna FOV that have active data traffic.

Figure 7B:
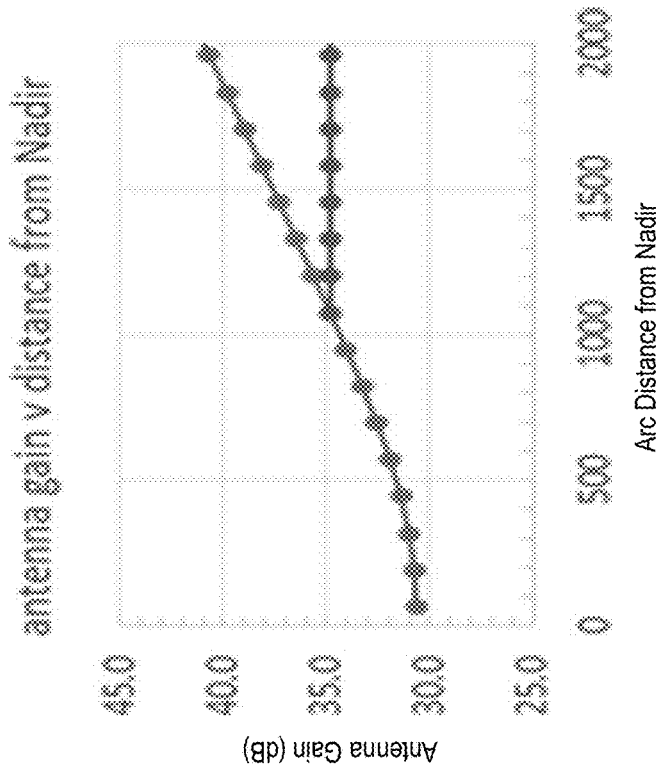
FIG. 7B shows the estimated variation in directivity depending on the position of a ground-based cell relative to the position of the satellite, in accordance with example embodiments of the present invention.
Figure 7A:
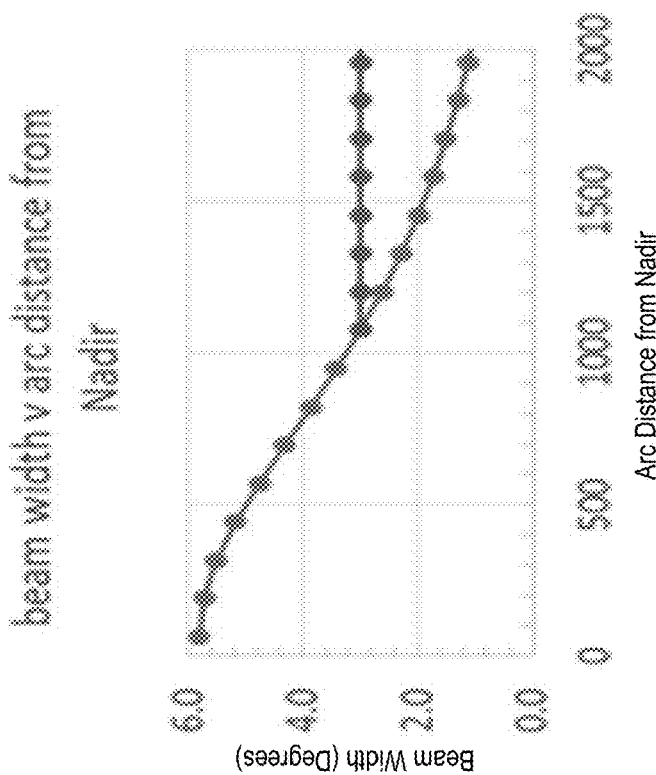
FIG. 7A shows the estimated variation in beam width depending on the position of a ground-based cell relative to the position of the satellite, in accordance with example embodiments of the present invention.
Figure 7C:
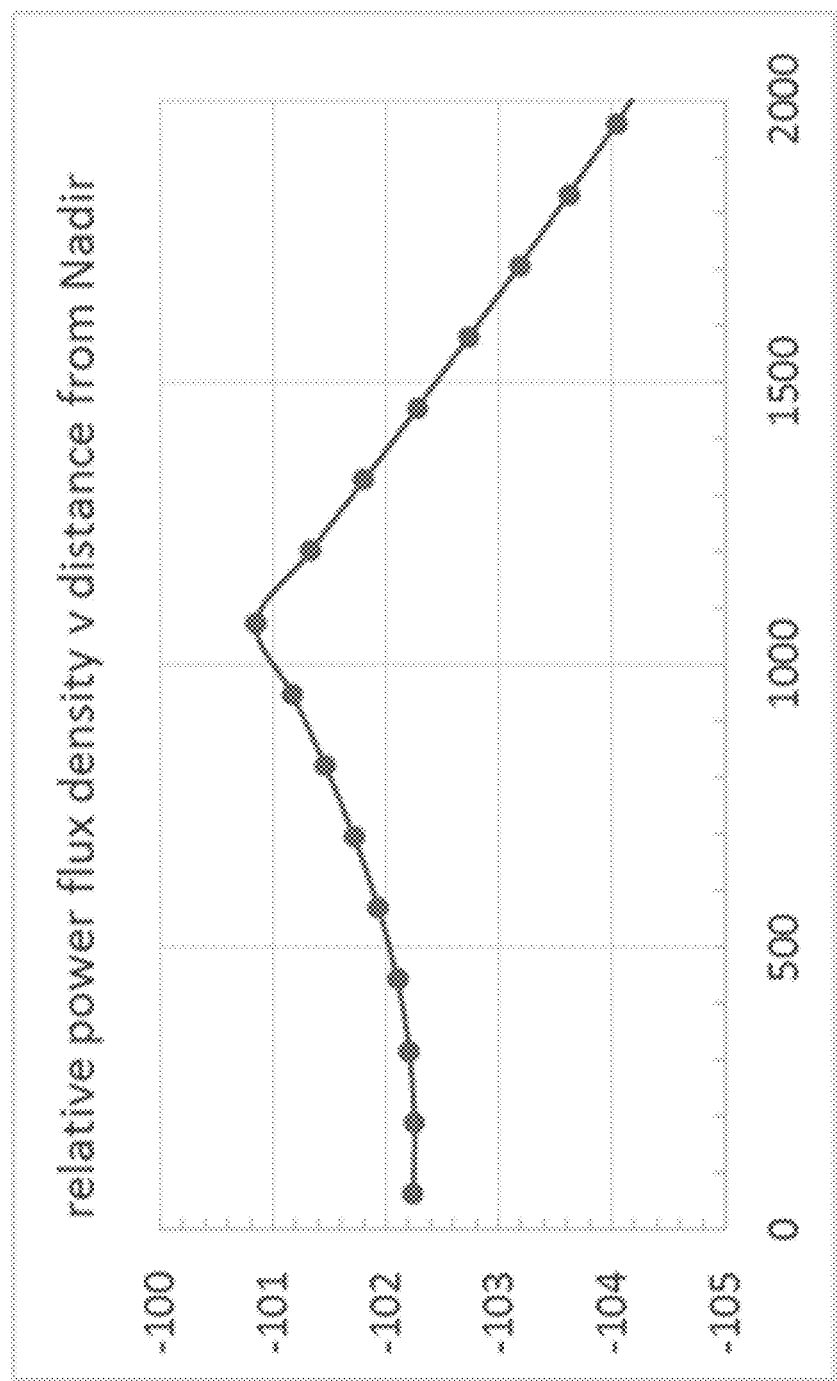
FIG. 7C shows the relative power flux density in dBw/Hz/m$^2$ assuming 1 Hz bandwidth and 1 Watt of transmit power, in accordance with example embodiments of the present invention.

FIG. 7A shows the estimated variation in beam width depending on the position of a ground-based cell relative to the position of the satellite, FIG. 7B shows the estimated variation in directivity depending on the position of a ground-based cell relative to the position of the satellite, and FIG. 7C shows the relative power flux density in dBw/Hz/m$^2$ assuming 1 Hz bandwidth and 1 Watt of transmit power, in accordance with example embodiments of the present invention. The narrower beams towards the edge of the coverage area translates to higher antenna gain. FIGS. 7A-7C reflect the performance of the beam patterns of FIGS. 4A and 4B, and Nadir reflects a beam angle of zero degrees, when the center of the satellite antenna is directly above the center cell of the respective ground-based cell pattern. As shown in the FIGS. 7A-7C, the beam with from the center cell out to the edge cells is being decreased from 6.0° down to 3.0° (as shown by the flattening of the curve of FIG. 7A, starting at the Arc Distance of approximately 1100), and thus the gain to the cells at the edge of the cell pattern increases by approximately 5 dB (as shown by the flattening of the curve of FIG. 7B, again, starting at the Arc Distance of approximately 1100). As shown by FIG. 7C, however, the gain does not result in an associated increase in relative power flux density, based at least in part on the increased path loss due to the increased distance to the edge cells. The relative power flux density increases by only approximately 1 dB even though the gain increases by approximately 5 dB. Accordingly, the power flux density remains relatively uniform across all the cells of the fixed ground-based cell pattern.

According to further example embodiments, the beam forming coefficients can be computed on the ground and uploaded to the satellite/HAP, thereby avoiding the processing needed for determining the beamforming coefficients on the platform. In the case of satellites, however, this approach has the disadvantage that it requires a significant amount of uplink communications resources. For example, if we consider a phased array comprising of 2000 elements, a beamforming coefficient vector to form a single beam requires uploading about 2000*16=32000 bits/cell/orbit location update/satellite. Assuming a coverage area of about 200 cells, an update every 0.1 second to account of the platform movement, and a constellation of 100 satellites, this translates to about 32000*200*100/0.1=6400 Mbps. This is amount of uplink capacity uploading beamcoefficients is not practical for satellite systems.

The coordinate conversion needed to map the geocentric latitude-longitude coordinates of the cell center into the satellite antenna coordinate system also requires computation resources. In the case of satellites, which have a highly predictable orbit pattern, and since the cell centers are known and fixed, this coordinate conversion can be done apriori and stored on the platform. In the case of HAPs, the orbital pattern is not predictable to the required accuracy. In this case the coordinate conversion must be done in real time on the platform itself.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A wireless telecommunications apparatus comprising:
one or more antennae, each configured to generate a plurality of communications beams within a respective footprint or field of view (FOV) of the antenna on the surface of the Earth, wherein each communications beam is configured to provide data communications services over a coverage area of a respective cell on the surface of the Earth; and
one or more processors configured to dynamically vary each of the plurality of communications beams of at least one of the one or more antennae to form the respective cells in a fixed cell pattern of fixed cell shapes that remain fixed relative to the surface of the Earth, such that, as the wireless telecommunications apparatus travels through an orbit around the Earth, the footprint of each of the one or more antennae sweeps across the surface of the Earth and provides the communications services via the cells of the fixed cell pattern that are within the footprint of that antenna at each of a plurality of points in time based on a frequency of the dynamic variation of each of the plurality of communications beams of the at least one of the one or more antennae; and
wherein each of the at least one of the one or more antennae consists of a planar phased array antenna which includes an array of a plurality of antenna elements, and which is configured to generate the plurality of communications beams at each point in time based on determined beam coefficient vectors configured to be applied in parallel to respective element signals to be respectively fed to the plurality of antenna elements to generate respective beam signals.

2. The wireless telecommunications apparatus according to claim 1, wherein each of the one or more antennae is a phased array antenna configured to generate the plurality of communications beams at each point in time based on a determined beam coefficient vector applied as weights to element signals of the phased array to generate respective beam signals.

3. The wireless telecommunications apparatus according to claim 2, wherein:
each of the cells of each fixed cell pattern is of a hexagonal shape defined by respective cell coordinates including a cell center and six vertices on the surface of the Earth;
the communications beam for each of the cells of each fixed cell pattern is generated at each point in time by translating the respective cell coordinates on the surface of the Earth to corresponding coordinates in a coordinate system of the respective antenna, the coordinates for each cell in the coordinate system of the antenna define pointing of the respective communications beam relative to the respective phased array, which are used to determine the respective beam coefficient vector.

4. The wireless telecommunications apparatus according to claim 3, wherein the respective cell coordinates on the surface of the Earth for each cell of each fixed cell pattern are specified either by latitude and longitude points for a cell center and six vertices on the surface of the Earth or by a three-dimensional coordinate system relative to the center of the Earth.

5. The wireless telecommunications apparatus according to claim 3, wherein the respective coordinates in the coordinate system of the respective antenna for each cell of each fixed cell pattern are specified either in terms of azimuth ($\theta$) and elevation ($\phi$) angles relative to the phased array of the respective antenna, by coordinates in a U/V space relative to the phased array of the respective antenna or by a three-dimensional coordinate system relative to a center of the phased array of the respective antenna.

6. The wireless telecommunications apparatus according to claim 1, wherein the one or more processors dynamically vary each of the plurality of communications beams of the at least one of the one or more antennae, at least in part, by varying one or more of a direction, width and directivity of the beam based on a location of the respective cell being illuminated within the fixed cell pattern.

7. The wireless telecommunications apparatus according to claim 1, wherein the frequency of the dynamic variation of each of the plurality of communications beams of the at least one of the one or more antennae is based at least in part on one or more of a level of interference experienced between beam adjustments and an ability of ground-based communications terminals within each cell to close a communications link for accessing the respective data communications services.

8. The wireless telecommunications apparatus according to claim 1, wherein:
each of the cells of each fixed cell pattern is defined with respect to a cell center in a coordinate system relative to the surface of the Earth;
the FOV of each of the at least one of the one or more antennae is defined as a plane containing a grid of points in a coordinate system of the antenna, and the beam coefficient vector for each grid point is predetermined for generation of a resulting beam that points in a direction based on the grid point and achieves a respective beam-width and directivity;
for each of the plurality of communications beams of the at least one of the one or more antennae, at each point in time, (i) when the wireless telecommunications apparatus is in a position that the respective cell center coincides with a one of the grid points, the one or more processors are configured to use the beam coefficient vector for the one grid point to generate the beam, and (ii) when the wireless telecommunications apparatus is in a position that the respective cell center does not coincide with any of the grid points, the one or more processors are configured to determine the respective beam coefficient vector by interpolation based on the beam coefficient vectors corresponding to a set of the grid points nearest to the cell center to generate the beam.

9. The wireless telecommunications apparatus according to claim 8, wherein, for each of the at least one of the one or more antennae, the beam coefficient vectors are predetermined for only the grid points of a one subsection of the respective phased array based on symmetries in geometry of the phased array, and the one or more processors are configured to utilize the symmetries in geometry to determine the beam coefficient vectors for the grid points of other subsections of the phased array.

10. A method comprising:
generating, via one or more antenna of a wireless telecommunications platform, a plurality of communications beams within a respective footprint or field of view (FOV) of the antenna on the surface of the Earth, wherein each communications beam is configured to provide data communications services over a coverage area of a respective cell on the surface of the Earth; and
dynamically varying, via one or more processors of the wireless telecommunications platform, each of the plurality of communications beams of at least one of the one or more antennae to form the respective cells in a fixed cell pattern of fixed cell shapes that remain fixed relative to the surface of the Earth, such that, as the wireless telecommunications apparatus travels through an orbit around the Earth, the footprint of each of the at least one of the one or more antennae sweeps across the surface of the Earth and provides the communications services via the cells of the fixed cell pattern that are within the footprint of that antenna at each of a plurality of points in time based on a frequency of the dynamic variation of each of the plurality of communications beams of the at least one of the one or more antennae; and
wherein each of the at least one of the one or more antennae consists of a planar phased array antenna which includes an array of a plurality of antenna elements, and the plurality of communications beams are generated at each point in time based on determined beam coefficient vectors configured to be applied in parallel to respective element signals to be respectively fed to the plurality of antenna elements to generate respective beam signals.

11. The method according to claim 10, wherein the plurality of communications beams of each of the one or more antennae is generated at each point in time based on a determined beam coefficient vector applied as weights to element signals of a phased array of the antenna to generate respective beam signals.

12. The method according to claim 11, wherein:
each of the cells of each fixed cell pattern is of a hexagonal shape defined by respective cell coordinates including a cell center and six vertices on the surface of the Earth;
the communications beam for each of the cells of each fixed cell pattern is generated at each point in time by translating the respective cell coordinates on the surface of the Earth to corresponding coordinates in a coordinate system of the respective antenna, the coordinates for each cell in the coordinate system of the antenna define pointing of the respective communications beam relative to the respective phased array, which are used to determine the respective beam coefficient vector.

13. The method according to claim 12, wherein the respective cell coordinates on the surface of the Earth for each cell of each fixed cell pattern are specified either by latitude and longitude points for a cell center and six vertices on the surface of the Earth or by a three-dimensional coordinate system relative to the center of the Earth.

14. The method according to claim 12, wherein the respective coordinates in the coordinate system of the respective antenna for each cell of each fixed cell pattern are specified either in terms of azimuth (θ) and elevation (φ) angles relative to the phased array of the respective antenna, by coordinates in a U/V space relative to the phased array of the respective antenna or by a three-dimensional coordinate system relative to a center of the phased array of the respective antenna.

15. The method according to claim 10, wherein each of the plurality of communications beams of the at least one of the one or more antennae are dynamically varied, at least in part, by varying one or more of a direction, width and directivity of the beam based on a location of the respective cell being illuminated within the fixed cell pattern.

16. The method according to claim 10, wherein the frequency of the dynamic variation of each of the plurality of communications beams of the at least one of the one or more antennae is based at least in part on one or more of a level of interference experienced between beam adjustments and an ability of ground-based communications terminals within each cell to close a communications link for accessing the respective data communications services.

17. The method according to claim 10, wherein:
each of the cells of each fixed cell pattern is defined with respect to a cell center in a coordinate system relative to the surface of the Earth;
the FOV of each of the at least one of the one or more antennae is defined as a plane containing a grid of points in a coordinate system of the antenna, and the beam coefficient vector for each grid point is predetermined for generation of a resulting beam that points in a direction based on the grid point and achieves a respective beam-width and directivity;
for each of the plurality of communications beams of the at least one of the one or more antennae, at each point in time, (i) when the wireless telecommunications apparatus is in a position that the respective cell center coincides with a one of the grid points, the beam coefficient vector for the one grid point is used to generate the beam, and (ii) when the wireless telecommunications apparatus is in a position that the respective cell center does not coincide with any of the grid points, the respective beam coefficient vector is determined by interpolation based on the beam coefficient vectors corresponding to a set of the grid points nearest to the cell center to generate the beam.

18. The method according to claim 17, wherein, for each of the at least one of the one or more antennae, the beam coefficient vectors are predetermined for only the grid points of a one subsection of the respective phased array based on symmetries in geometry of the phased array, and the one or more processors are configured to utilize the symmetries in geometry to determine the beam coefficient vectors for the grid points of other subsections of the phased array.

* * * * *